United States Patent [19]

Bannai et al.

[11] Patent Number: 4,674,053
[45] Date of Patent: Jun. 16, 1987

[54] CONTROL SYSTEM OF INJECTION MOLDING MACHINES

[75] Inventors: Saburo Bannai; Kiyoshi Kawashima, both of Numazu, Japan

[73] Assignee: Toshiba Kikai Kabushiki Kaisha, Tokyo, Japan

[21] Appl. No.: 906,690

[22] Filed: Sep. 11, 1986

Related U.S. Application Data

[63] Continuation of Ser. No. 583,327, Feb. 24, 1984, abandoned.

[30] Foreign Application Priority Data

Feb. 28, 1983 [JP] Japan .................. 58-32581

[51] Int. Cl.⁴ .................. G06F 15/00; B29H 5/00
[52] U.S. Cl. .................. 364/476; 364/146; 364/188
[58] Field of Search .......... 364/476, 188, 146, 131, 364/189, 191, 192

[56] References Cited

U.S. PATENT DOCUMENTS

| | | | |
|---|---|---|---|
| 4,281,379 | 7/1981 | Austin | 364/132 |
| 4,344,142 | 8/1982 | Diehr, II et al. | 364/476 |
| 4,369,052 | 1/1983 | Hotmer | 364/476 |
| 4,371,483 | 2/1983 | Mattson | 364/476 |
| 4,402,721 | 9/1983 | Ericson et al. | 364/476 |
| 4,457,772 | 7/1984 | Haynes | 364/476 |
| 4,504,920 | 3/1985 | Mickowski | 364/476 |
| 4,519,026 | 5/1985 | Nozawa et al. | 364/188 |
| 4,528,623 | 7/1985 | Tachibana | 364/188 |

OTHER PUBLICATIONS

Control Panels: From Pushbuttons to Keyboards to Touchscreens; *Control Engineering;* W. R. Flynn; Jun. 1984.

*Primary Examiner*—Joseph Ruggiero
*Assistant Examiner*—Allen MacDonald
*Attorney, Agent, or Firm*—Cushman, Darby & Cushman

[57] ABSTRACT

In a control system of an injection molding machine of the type including a data setting unit corresponding to injection and mold clamping operations of the injection molding machine, and a control device which is response to data set in the data setting unit forms an instruction signal which controls the injection and mold clamping operations, there are provided a central processing unit including a main memory region storing the molding data, display unit connected to the central processing unit for displaying the content of the main memory region, a setter for setting numerical data in the main memory region, and a setting inputting switch of the setter, the switch being located near a display unit of the display panel.

9 Claims, 14 Drawing Figures

FIG.8 (1)
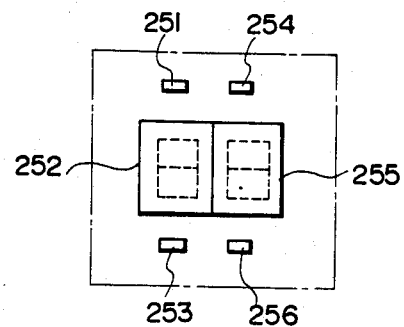
FIG.8 (2)
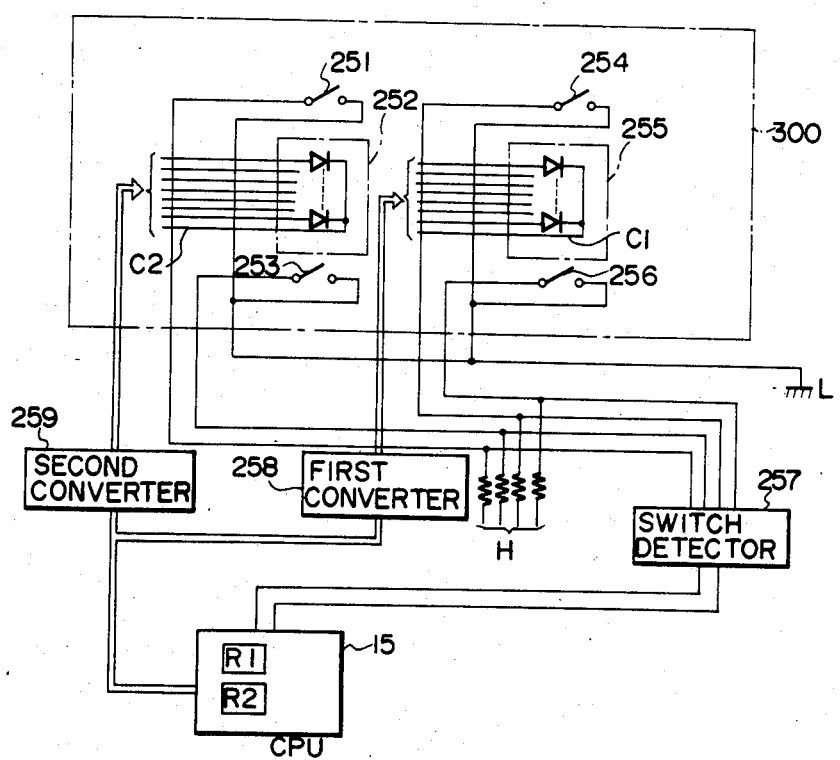

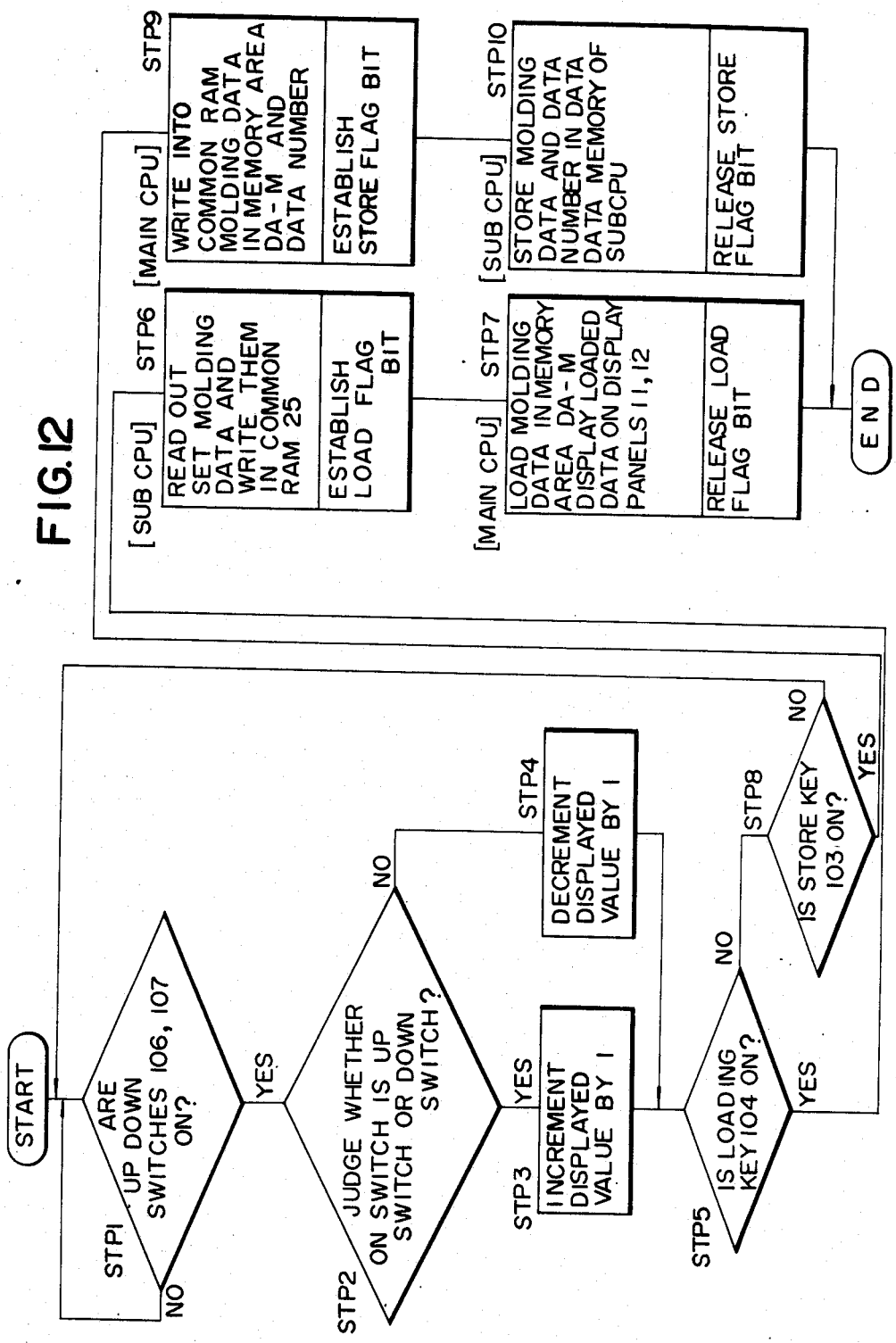

CONTROL SYSTEM OF INJECTION MOLDING MACHINES

This is a continuation of application Ser. No. 583,327, filed Feb. 24, 1984, which was abandoned upon the filing hereof.

BACKGROUND OF THE INVENTION

This invention relates to a control system of an injection molding machine, and more particularly to a control system of an injection molding machine wherein an operator can directly observe various parameters of the molding condition, can correct the parameters, can set them from outside and can display them.

FIG. 1 is a block diagram showing the steps of one molding cycle of a plastic injection molding machine. On the upper row of FIG. 1 are shown the steps of injection and plastic filling, pressure holding, and metering effected by the injection molding machine, while the lower row shows the steps of mold clamping, mold cooling, mold opening and product taking out executed on the side of a metal mold.

When molding various products with an injection molding machine, as shown in FIG. 1, the molding conditions of the products are influenced by a number of physical parameters such as temperature, pressure, speed or position and the type of resin at respective steps, so that in order to obtain satisfactory products it is necessary to correctly determine the values of many discrete parameters. For this reason, it has been necessary to determine the molding conditions necessary to obtain satisfactory products by using past experience as well as results of repeated tests.

In order to determine best molding conditions in the prior art, digital switches corresponding to such parameters as the temperature, pressure, speed, position, etc. regarding the molding conditions were mounted on a control panel having graphically depicted setters for respective parameters and display devices. With this construction, the operator corrects the values of respective digital switches according to the result of cut and try tests. With such a prior art method, however, the operator must manually correct the data regarding the parameters, so that in a system utilizing digital switches, settings and displays are done simultaneously by the operator. Such a method does not cause any serious problem where fixed data are set and displayed, but it is impossible to directly display (load performance) molding data rear out from a external memory medium on the operating panel without relying upon correction operations of respective switches performed by the operator.

Thus using a method wherein molding data for satisfactory products are obtained by a series of cut and try tests, and where the data of the digital switches on the operating panel are corrected, the contents and settings of the digital switches before correction by the operator are lost. Thus, it is necessary for the operator to record the contents of the digital switches each time a test is made.

Lack of storing performance regarding the molding data prolongs and complicates the process of the cut and try method wherein various parameters are corrected from time to time, products corresponding to the corrected parameters are molded and the parameters are corrected by observing correlations between various molding data and molded products.

In recent years, instead of using an operating panel provided with digital switches, a system utilizing a cathode ray tube (CRT) display device has been used. This system, however, is not only expensive, but also the screen of the CRT can display only divided pictures formed by dividing the operating panel into a number of sections. Moreover, when setting or correcting values of respective divided sections with operating keys, it is necessary to move a cursor to a portion, and then input data with a key. Accordingly, where there is much data to be corrected or set, since it is necessary to select a divided section, to move the cursor and to input data with keys, the operator can not immediately correct and set the molding data.

Where a write pen is used for the CRT display device, it is not necessary to use a key for inputting data to move the cursor, but such system is also expensive and must use divided sections and data input keys.

For simplifying the operation, it is advantageous to install the CRT display device near the injection molding machine together with the operating panel, but where the CRT is installed near the molding machine, it will be destroyed by vibrations or shocks as well as high temperatures.

SUMMARY OF THE INVENTION

Accordingly, it is a principal object of this invention to provide an improved control system for an injection molding machine capable of eliminating various defects described above.

Another object of this invention is to provide a control system of an injection molding machine capable of readily correcting data.

Still another object of this invention is to provide a control system of an injection molding machine in which molding data can be mutually transferred between a data memory device in the control system and an external memory device and can be displayed so that the operator can readily prepare molding data for new molded products.

According to this invention, there is provided a control system of an injection molding machine of the type including a data setting unit for setting molding data corresponding to injection and mold clamping operations of the injection molding machine, and a control device which in response to data set in the data setting unit forms an instruction signal which controls the injection and mold clamping operations, wherein there are provided a central processing unit including a main memory region storing the molding data; display means connected to the central processing unit for displaying the content of the main memory region; setting means for setting numerical data in the main memory region; and a setting inputting switch associated with the setting means, the switch being located near a display unit of the display means.

BRIEF DESCRIPTION OF THE DRAWINGS

In the accompanying drawings:

FIG. 8-(1) shows a data setting panel mounted on respective panels;

FIG. 8-(2) is a connection diagram showing the detail of the data setting panel;

FIG. 12 is a flow chart showing loading and storing routines of the molding data.

DESCRIPTION OF THE PREFERRED EMBODIMENT

A preferred embodiment of this invention will now be described in detail with reference to the accompanying drawings.

Figure 2:
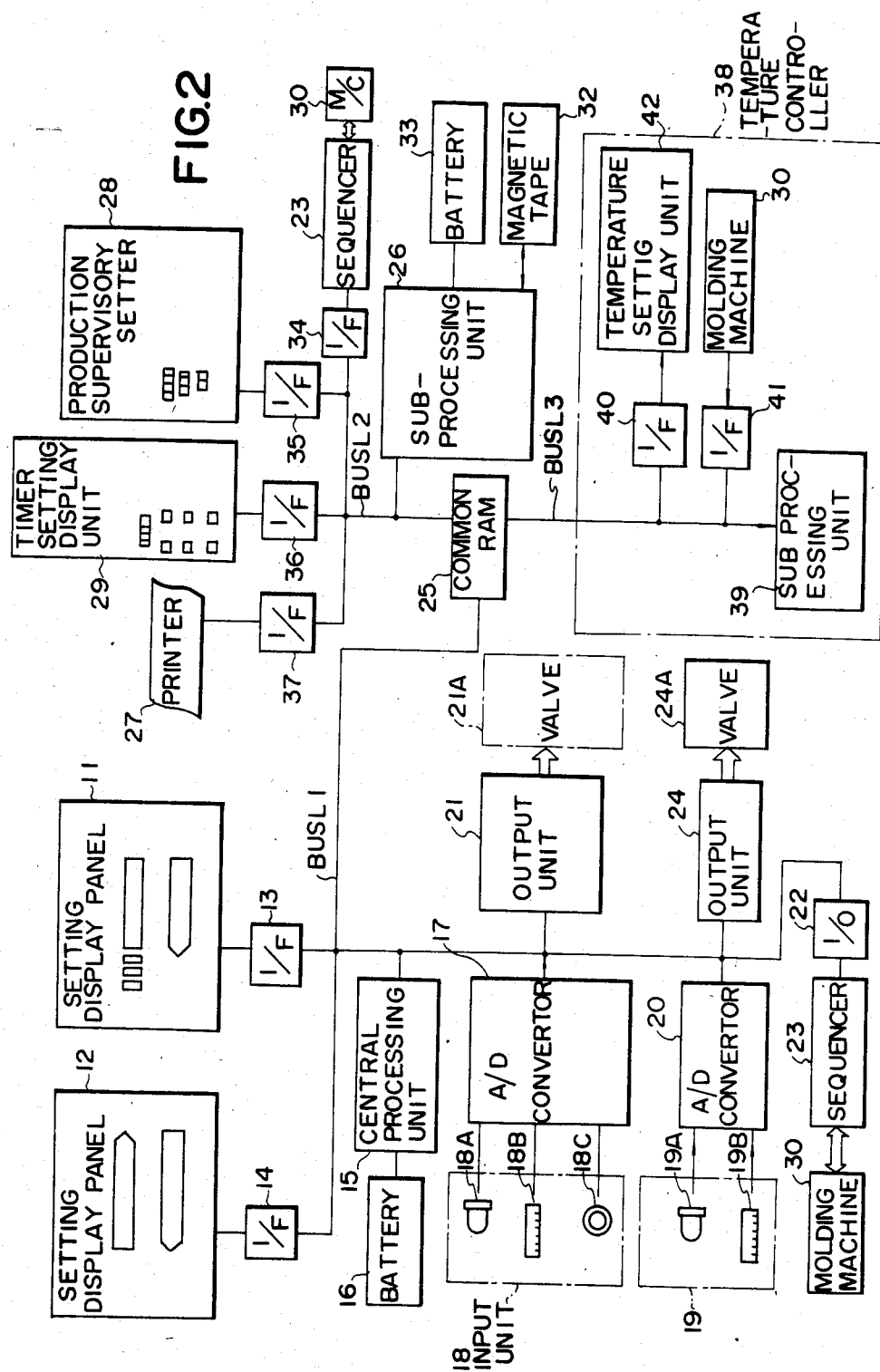
FIG. 2 is a block diagram showing one embodiment of the control system according to this invention.
Figure 6:
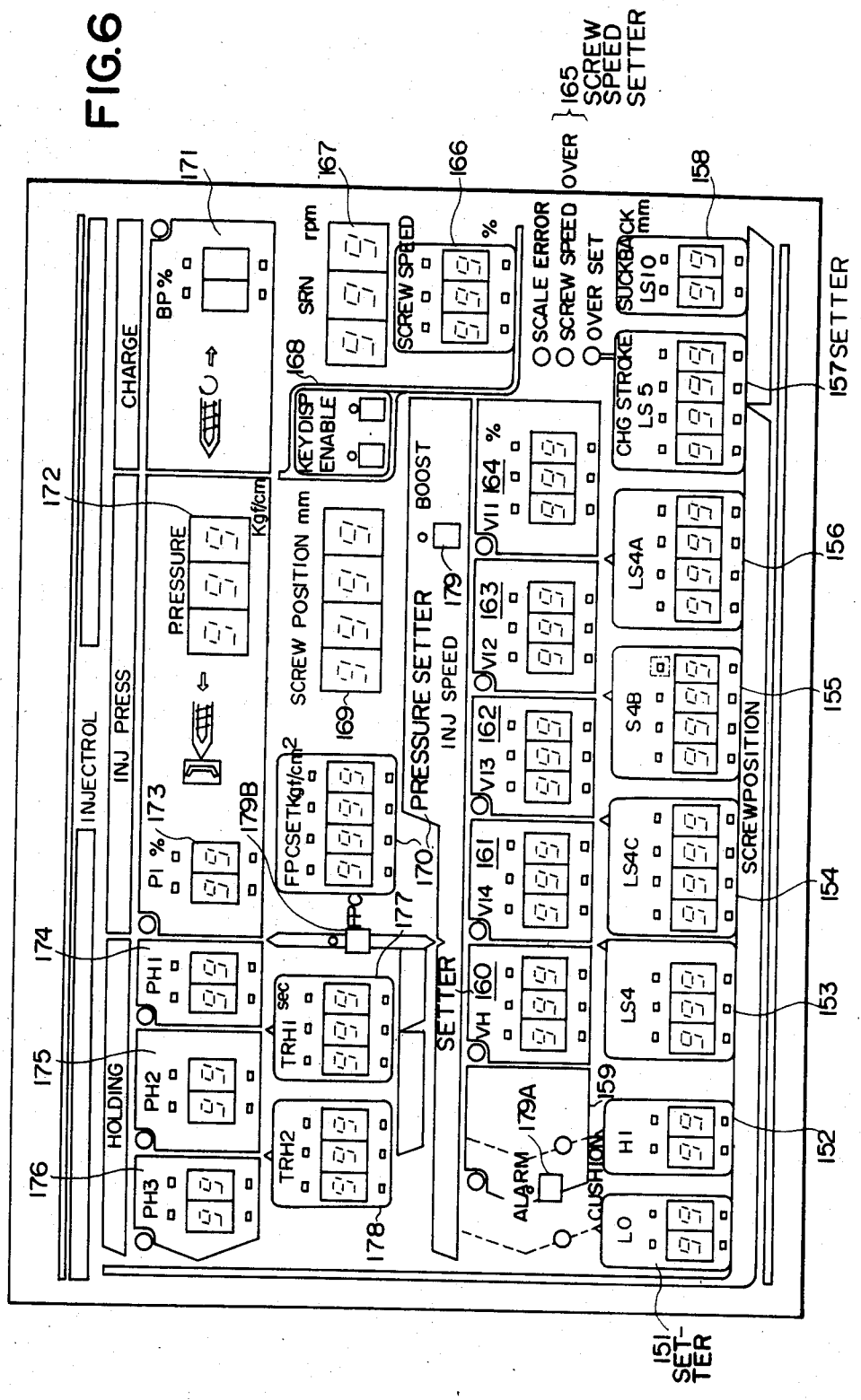
FIG. 6 is a front view showing a molding data setting panel.
Figure 7:
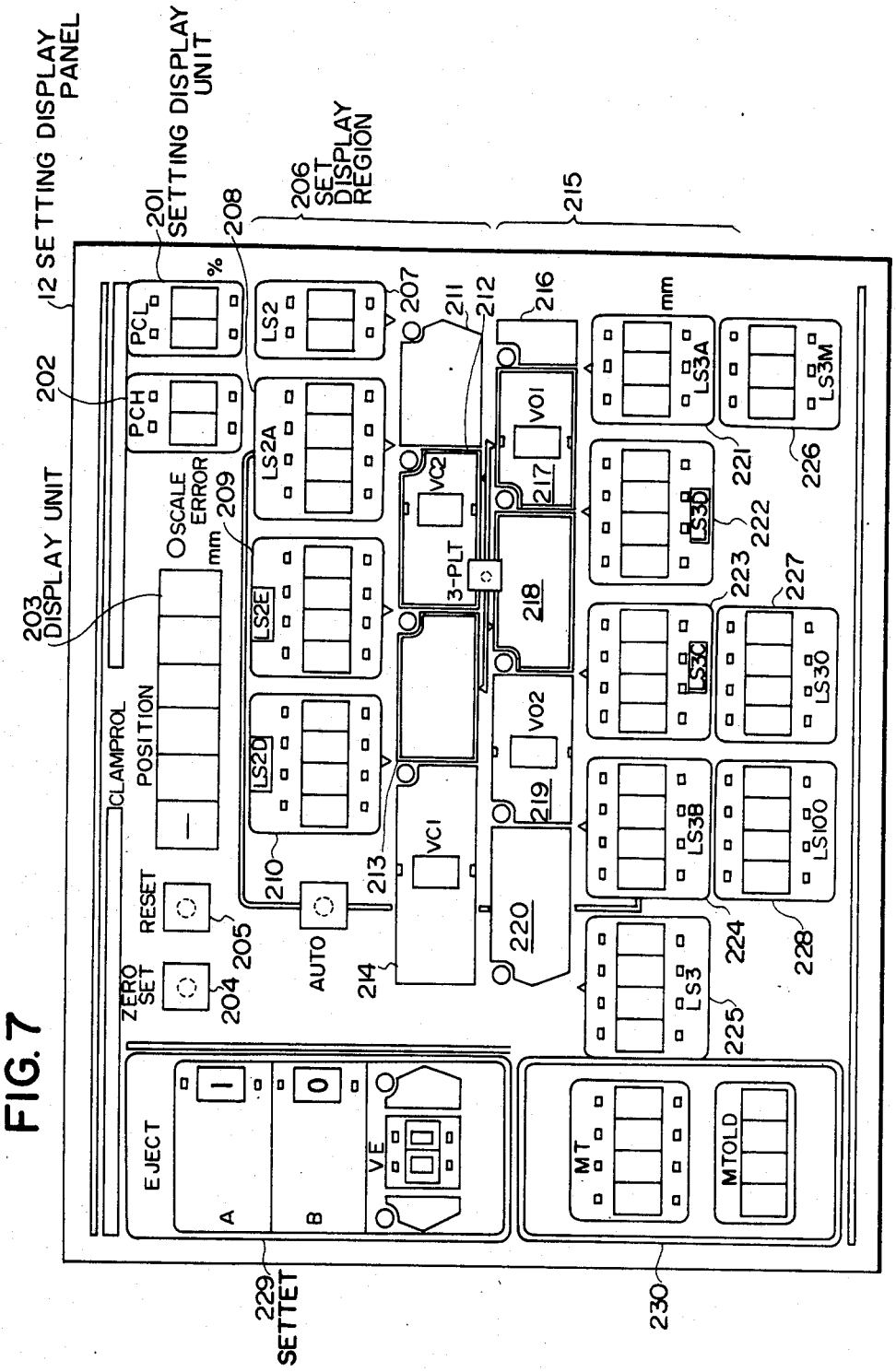
FIG. 7 is a front view showing a molding data setting display panel utilized at various steps of a mold clamping operation.

As shown in FIG. 2, there is provided a setting display panel 11 including data display units regarding injection molding steps of an injection molding machine and data setting and inputting units located near respective display units. The display units are arranged such that an operator can confirm the progress of the injection molding operation while observing the display units. There is also provided another setting display panel 12 including data display units regarding the metal mold clamping steps of the molding machine and data setting inputting units. Display units of setting display panel 12 are arranged similar to those of the setting display panel 11. The details of these setting display panels 11 and 12 are shown in FIGS. 6 and 7, respectively. The display panels 11 and 12 are connected to a bus line BUSL1 respectively through interfaces 13 and 14. A central processing unit (CPU) 15 is connected to the bus line BUSL1 and a nonvolatile memory device RAM, not shown, is backed up by a battery 16. In a data memory area DA-M in the RAM are stored molding data for injection operation and mold clamping operation given by respective setting input units of setting display panels 11 and 12, outputs of A/D converters 17 and 20 respectively connected to input units 18 and 19 of the molding machine, as well as data to be processed by output units 21 and 24, a sequencer 23 and a common RAM 25. Also in the central processing unit 15 are stored a program group processing the data stored in a program memory area PR-M in a ROM.

The input unit 18 forms input signals related to the injection operation, and an A/D converter 17 converts analogue signals produced by the input unit 18 into digital signals. The input unit 18 comprises, for example, a sensor 18A for detecting the injection pressure, a pulse scale 18B for detecting the screw position during injection, and rotation meter 18C for detecting the number of revolutions of a screw which is necessary to measure the quantity of the plastic injected. As above described, the input units 18 and 19 respectively comprise an input group and an A/D converter for forming input signals relating to the mold clamping operation. Thus, for example, the input unit 19 comprises a mold clamping pressure sensor 19A and a pulse scale 19B for detecting the position of the movable metal mold.

The output units 21 and 24 form a group of output signals directly related to the injection operation and the mold clamping operation, for example instructions to an electromagnetic flow quantity control valve and a relief valve, the instructions being converted into analogue signals and then applied to a valve 21A provided on the injection side and to a valve 24A provided on the mold clamping side. The sequencer 23 sends step transfer instructions between respective steps shown in FIG. 1 to the central processing unit 15 via an input/output circuit (I/O) 22. Also the sequencer 23 is supplied with output signals from limit switches or the like associated with the molding machine (M/C) 30 for controlling the interlocking relation among these signals.

The common RAM 25 is provided for the purpose of deriving out molding data represented by the display signals of the two setting display panels 11 and 12 from the data memory area DA-M of the central processing unit 15. Furthermore, the common RAM 25 is used as a buffer memory device which temporarily stores a group of molding data corresponding to a metal mold and stored in a subprocessing unit 26 and then transfers the molding data to the data memory area DA-M of the central processing unit 15. A group of the molding data in the subprocessing unit 26 and corresponding to the metal mold may be prestored in such nonvolatile memory device as a ROM.

Alternatively, an external memory device such as a magnetic tape 32 may be connected to the subprocessing unit 26 so as to temporarily store the data of the magnetic tape 32 in a data memory RAM in the subprocessing unit 26. It is also possible to read out the molding data to the magnetic tape 32 from the subprocessing unit 26. The nonvolatile memory device RAM in the subprocessing unit 26 is supplied with power from a battery 33. There are also provided a printer 27 and an interface 37 for printing out data stored in the common RAM 25 via a bus line BUSL2. A production supervisory information setter 28 is connected to the bus line BUSL2 through an interface 35. The production supervisory information setter 28 is set with a designation information of the metal mold and the number of shots of the products molded with the mold. A timer setting display unit 29 is provided with a switch for data load designation and displays a molding cycle time of products manufactured by a metal mold, an injection time, and a period in which air is flashed against the metal mold. The timer setting display unit 29 is connected to the bus line BUSL2 via an interface 36. At the time of loading data in the unit 29 the molding data transferred to the common RAM 25 from the RAM of subprocessing unit 26 are loaded in the data memory area DA-M of the central processing unit 15. Furthermore, the unit issues an instruction for transferring the molding data from the memory area DA-M of the central processing unit 15 to the common RAM 25.

At the time of setting the timer, should the timer time exceed a preset time (for example, one molding cycle time), it is judged that this condition corresponds to an overtime condition so that an overtime instruction is given to a sequencer 23A via an interface 34 to cause the sequencer 23 to send a necessary instruction (for example, an alarm instruction) to the molding machine 30A. A temperature setting display unit 27 having a construction similar to the setting display panels 11 and 12 and included in a temperature controller 38 is connected to a bus line BUSL3 via an interface 40. The temperature setting display unit 42 further includes a temperature adjuster, not shown, for controlling a heater temperature. The bus line BUSL3 is connected to the common RAM 25 and another subprocessing unit 39. The temperature setting display panel 42 is constructed to be set with digital values of the temperatures at various portions of the molding machine 30 and to receive the molding machine signals regarding temperature control of various portions thereof through an interface, for example the temperature of oil of an oil pressure unit and the temperature of the molten plastic in the injection cylinder. The subprocessing unit 39 includes a RAM temporarily storing data regarding the temperature of the molding machine and a ROM storing a processing program regarding temperature control.

Figure 1:
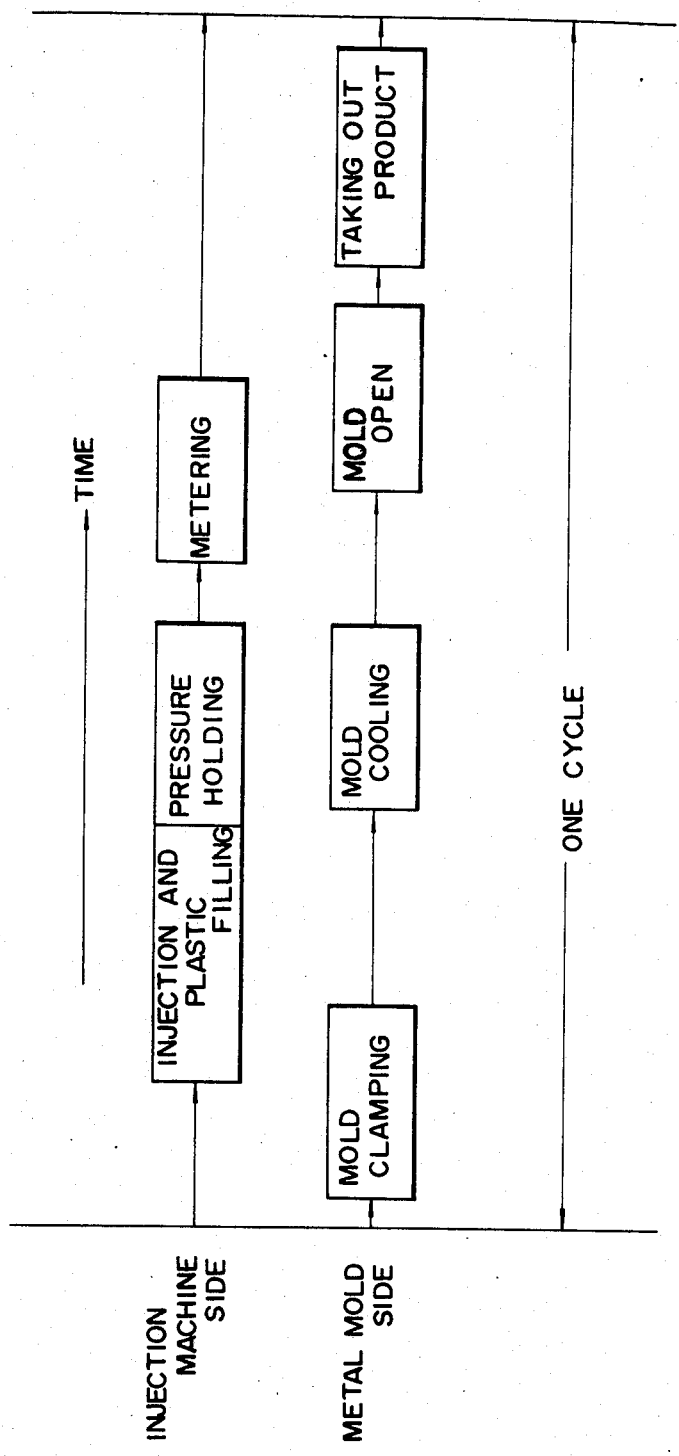
FIG. 1 is a block diagram showing various steps executed by an injection molding machine.
Figure 3:
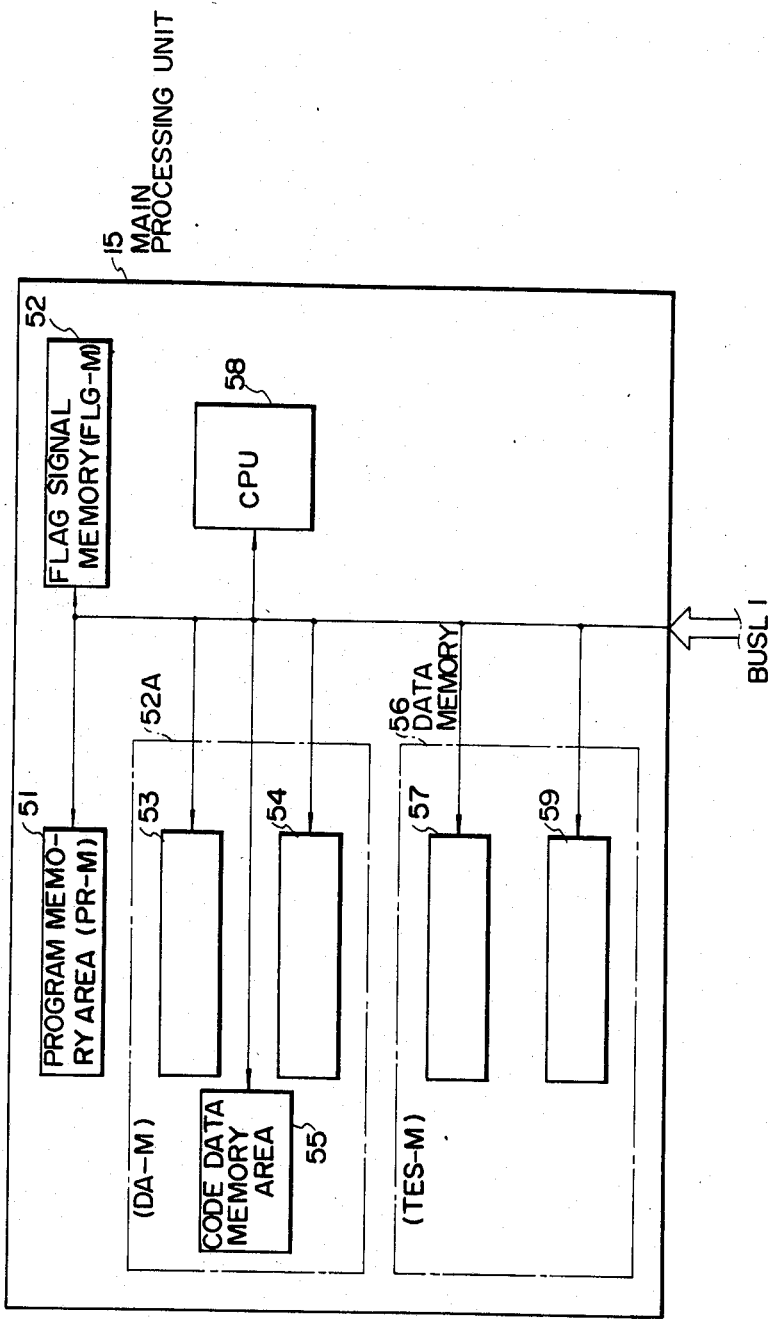
FIG. 3 is a block diagram showing a central processing unit.

FIG. 3 is a block diagram showing the principal construction of the central processing unit 15 in which 51 represents a program memory area PR-M storing a group of instructions for controlling the operation of a CPU 58. 52 represents a portion of a data memory area DA-M and used as a flag signal memory corresponding to the presence or absence of a termination signal or starting signal of respective steps shown in FIG. 1, the signals being applied from the sequencer 23 via the bus line BUSL1. In accordance with the flag bits corresponding to respective steps stored in the flag signal memory area a group of instruction programs in the program memory area 51 are made effective. For example, in the injection steps shown in FIG. 1, when the flag bit regarding plastic filling changes to "1" from "0", a group of instructions corresponding to the filling step are made effective in a memory area 51, and these instructions are sequentially executed by the CPU 58. While the instructions are being executed, data necessary for executing the instructions are sent to the CPU 58 from the memory area 53 in the data memory area DA-M52A. When the flag bit corresponding to the mold clamping step shown in FIG. 1 changes to "1" from "0", the instruction program regarding the mold clamping step and stored in the memory area 51 is made effective. Thus, the data is sent to the CPU 58 from a data memory area regarding the mold clamping and stored in the data memory area. A memory area 55 is provided to store code data inherent to a specific metal mold and to check whether the molding data stored in the data memory areas 53 and 54 correspond to the specific metal mold or not. More particularly, molding data regarding a given metal mold and given through the common RAM 25 shown in FIG. 2 are stored in memory areas 53, 54 and 55 in the data memory area 52A. Where an actual metal mold is combined with the molding machine and a code specific to the metal mold is read, the CPU58 judges whether the read code and a code stored in the memory coincide with each other or not. This check program is stored in the process program area 51 and constitutes one of the conditions for starting the molding cycle. A test data memory device 56 comprises data memory areas 57 and 59 respectively corresponding to memory areas 53 and 54. The data stored in the memory areas 53 and 54 are used to execute normal operation of the molding operation. Accordingly, where a test data is prepared and stored in the data memory device 56, the molding machine can be operated based on this data but without molding plastic, thus enabling a checking whether the machine can operate normally before its normal operation. The test data memory device may be a nonvolatile memory device. A test program is stored in the program memory area 51 corresponding to the test data memory device.

Figure 4:
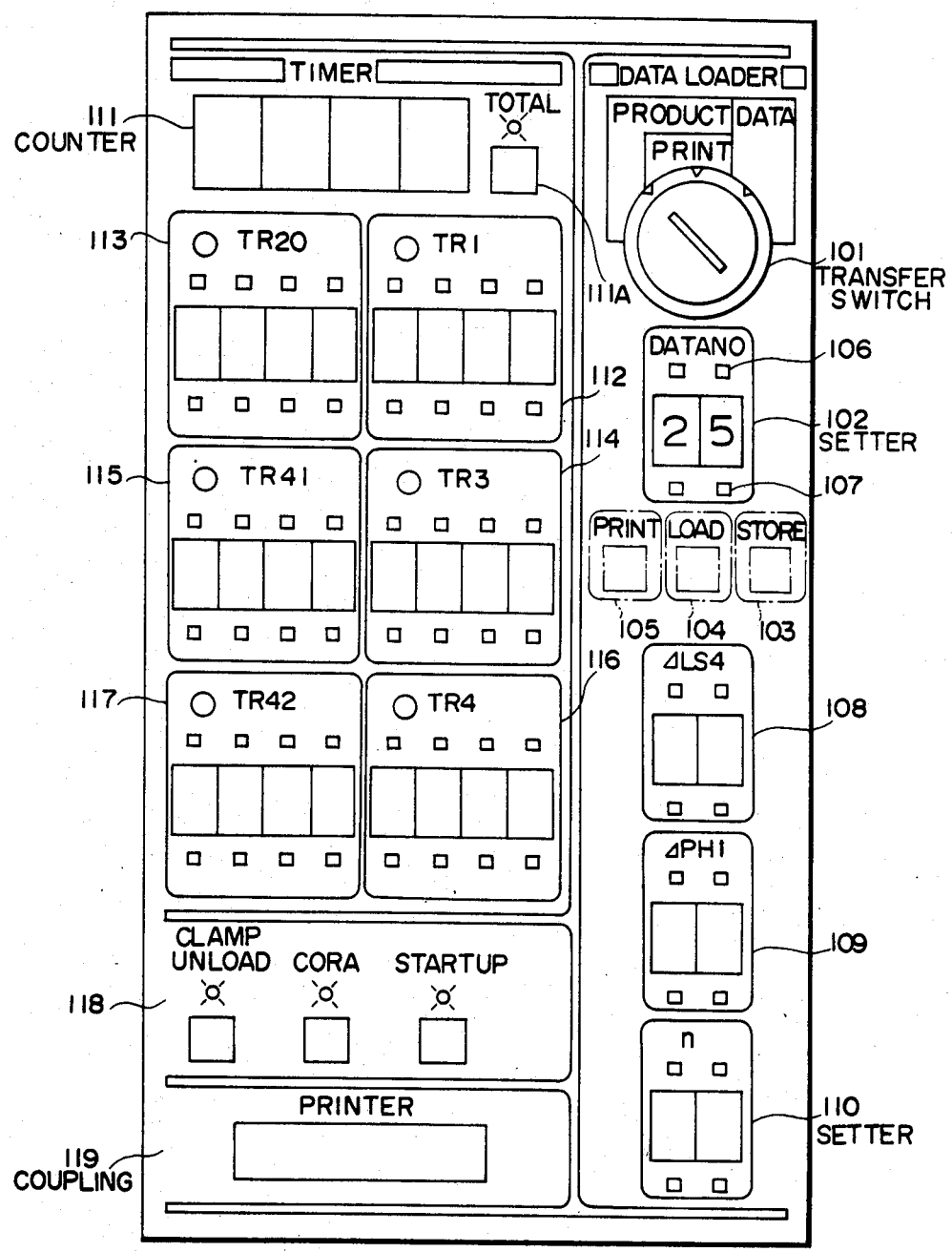
FIG. 4 is a front view showing a panel including a timer setting display unit and data transfer instruction apparatus.

FIG. 4 shows a detail of the front surface of the set display unit 29 shown in FIG. 2. On the right side of FIG. 4 are mounted switches regarding a data loader. A transfer switch 101 is operated to select a case (PRODUCT) wherein products are continuously manufactured, a case (PRINT) in which the molding data are printed out, and a case (DATA) wherein the molding data are transferred to the central processing unit 15 to be stored in the data memory area DA-M thereof or wherein the data are transferred to the comon RAM 25 from the memory area DA-M. A setter 102 is provided for setting the number or code of the molding data corresponding to a given metal mold. FIG. 4 shows a state in which the setter 102 is set to a molding number 25. The setter 102 includes push button switches 106 and 107 for UP and DOWN respectively. These switches are constructed such that each time when the push button 107 is depressed under a state shown in the drawing, the displayed digits decrease in an order of 5→4→3→2→1→0→9 . . .

Push button switches 103, 104 and 105 are provided for starting a typewriter, for loading data from the common RAM 25 into the data memory area DA-M of the central processing unit 15, and for transferring the content of the data memory area DA-M to the common RAM 25. Switches 108 and 109 are provided for gradually bringing the pressure holding transfer position to a normal position LS4 by considering the fact that the screw position of the molding machine does not yet reach a steady state immediately after starting the molding operation so that the pressure holding transfer position is selected to a position slightly before a pressure holding position LS4 which represents that the screw has reached the pressure holding position. A set value ΔLS4 shows the amount of movement or change of the pressure holding position of the screw corresponding to one molding shot. Switch 109 sets the amount of variation ΔPH1 of the pressure held for each shot when the held pressure is brought to a first held pressure PH1 under the steady state.

Setter 110 is provided to set the number of revolutions thereof n to bring the set values to LS4 and PH1 under the normal state by giving n times the set values ΔLS4 and ΔPH1. Normally, n is set to be about 100.

On the left side are mounted setters 112, 114 and 116 respectively designated by TR1, TR3 and TR4 for setting an injection time, a metal mold cooling time, and a time required for discharging a molded product from a metal mold. Setters 113, 115 and 117 respectively designated as TR20, TR41 and TR42 set a molding cycle time (a time required for molding one product, and a time of air blow when the molded product is removed from stationary and movable metal mold). Counters 111 are mounted on the upper portion of the panel for counting and displaying intervals following the startings of operations of respective setters 112–117. Furthermore, when a push button 111A is depressed, an actual cycle time of the previous molding shot is displayed.

A plurality of push button switches 118 are provided for issuing start instructions of a molding cycle, a core driving instruction, and an energy saving instruction (which is used to actuate a mechanism that can produce a sufficient clamping force even when an oil pump is unloaded at the time of mold clamping). A coupling 119 is provided for the printer 27. (See FIG. 2)

Figure 5:
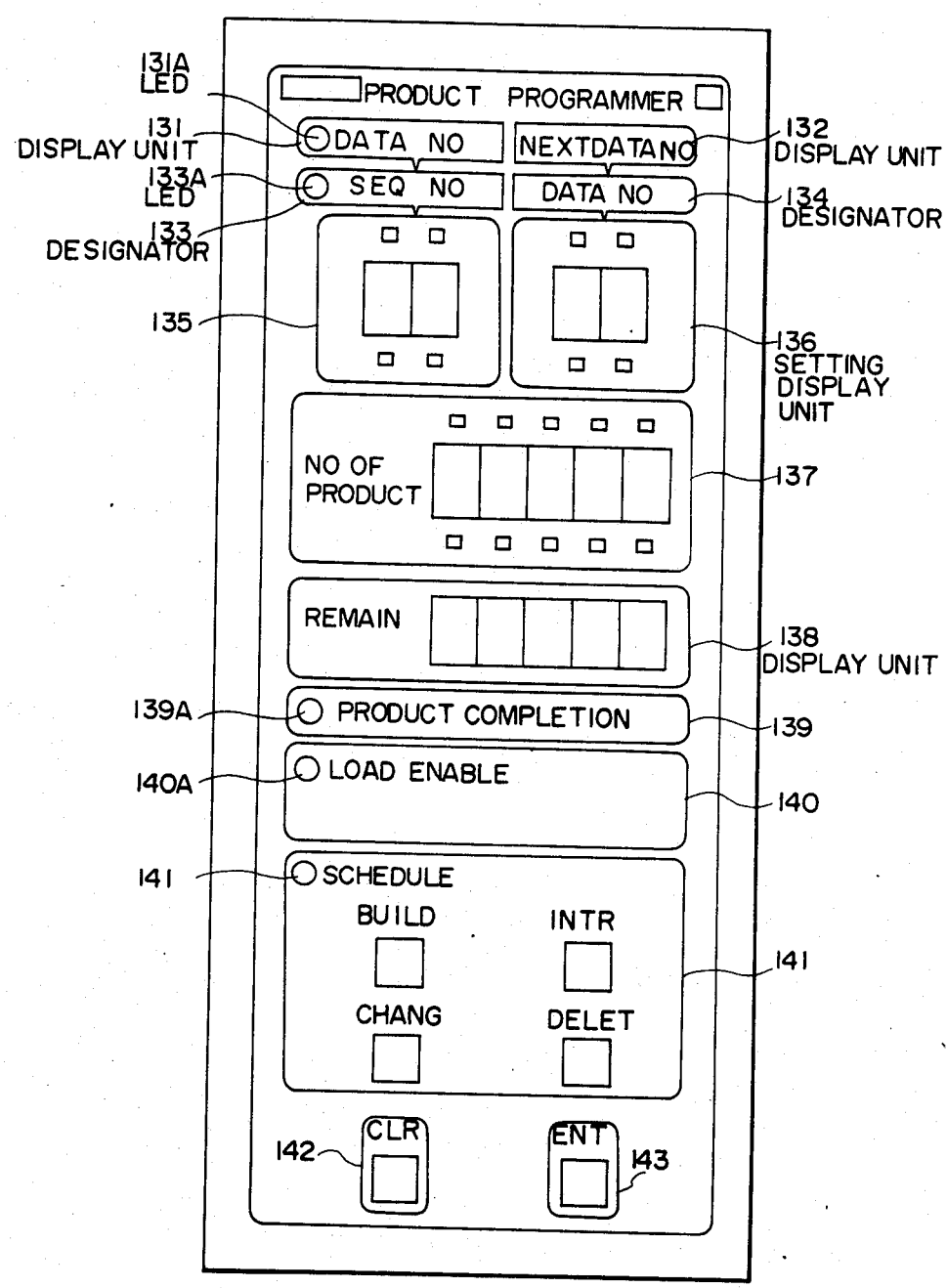
FIG. 5 is a front view showing a production schedule setting display panel.

FIG. 5 shows the detail of the panel surface of a set display unit that sets and displays instructions regarding a production programming. In FIG. 5, 131 and 132 designate display units that designate present and next molding data numbers and include a luminous element 131A. When the luminous element 131A is lighted, the molding data numbers are displayed on display units 135 and 136. Designators 133 and 134 sequentially designate serial numbers for molded products when the luminous element 133A is lighted at the time of preparing a production schedule so as to set molding data numbers in setting display units 135 and 136 at the lower stage corresponding to the serial numbers.

Furthermore, a setting display unit 137 is provided for setting and displaying the number of products prepared in accordance with respective molding data at the time of preparing the production schedule. A display unit 138 is provided for displaying the number of not yet molded products while executing molding operations of products of a given type.

Display units 139 and 140 are provided with luminous elements 139A and 140A respectively which display termination of manufacturing of the products of one type as well as a condition in which molding data of another type can be loaded. A group of instruction push buttons 141 are utilized for setting data regarding the production schedule in which a push button BUILD is utilized for sequentially setting the sequence number and the molding data number in the setting display units 135 and 136. A push button INTR is used for inserting a new sequence number and a new molding data number into a series of sequence numbers and molding data numbers previously set. Push buttons CHANG and DELET are used for changing and deleting previously set sequence number and a molding data number. Furthermore, push buttons 142 and 143 are used for returning a sequence number to the original number at the time of preparing a schedule, and for storing a set of sequence numbers, molding data and the number of products in the data memory device.

FIG. 6 is a front view showing an operation display panel mounted with setters of the molding data concerning respective steps on the injection side, that is plastic filling, pressure holding and metering steps shown in FIG. 1. At the bottom stage shown in FIG. 6 are provided setters of screw positions. Beginning with the left side setters, 151 and 152 are used to set cushioning quantity at the fore end of the screw, the cushioning quantity being given as a variation widths LC (low cushion state) and HC (high cushion state) with respect to the reference position of the screw front end SC. During a molding cycle, so long as the screw position lies in a dotted line area immediately before starting the metering step, no alarm signal would be issued. 157 designates a setter for a retracted limit position (LS5) of the screw, while setters 154, 155 and 156 represent reference positions issuing speed signals corresponding to the stroke of the screw during the filling step. Another setter 153 designates a position at which filling step is transferred to the pressure holding step. Setter 158 represents the extent of injection nozzle retraction generally called "SUCK BACK". When this quantity is given, it is possible to prevent leakage of the plastic from the front end of an injection nozzle when the nozzle is separated away from the metal mold.

On the second stage from bottom are mounted screw speed setters 165, 163, 162 and 161 giving speed set values of the screw between respective position setters 157, 156, 155, 154 and 153 during the filling step. A setter 160 sets the degree of opening of an electromagnetic flow control valve while the plastic pressure is maintained at a predetermined value. In other words, the setter 160 designates the flow quantity during pressure control when the step is switched from filling step to pressure holding step. A group of lamps 165 are provided including a scale error lamp for displaying an abnormal condition of a screw position detector, a lamp which is lighted when the number of revolutions of the screw exceeds a maximum value and a lamp lighted when the stroke exceeds a maximum value inherent to the screw and when the value LS5 is set. A setter 166 is provided to display the number of rotations of the screw, in %, during the metering step set for the maximum number of revolutions (r.p.m.) of the screw, while a unit 167 displays the actual number of revolutions of the screw detected by a screw speed detector. A pressure increase instruction push button 179 is provided for increasing the injection speed set by setters 161–164. A switch 168 is provided for enabling UP and DOWN switches provided on the upper and lower sides of respective data setters on the panel shown in FIG. 6. When a switch 168A is not depressed, right hand display switch 168B is enabled to cause it to perform only a cycle display, thereby preventing set data from changing as a result of careless contact. There are also provided a display unit 169 displaying the actual position of the screw, a pressure setter 170 operated at the end of the filling step (Final Packing Control - FPC), a setter 171 for setting, in %, the back pressure during the metering step (that is the screw is retracted while rotating), a setter 172 setting the actual pressure during the injection stroke in which the screw advances, a setter 173 for setting, in %, the injection pressure with reference to a predetermined maximum value. More particularly, the pressure display unit 172 displays the injection pressure as a back pressure during the injection stroke in which the screw moves forwardly. Setting display units 174, 175 and 176 set and display the pressure held under the pressure holding state. Upon completion of the injection state, the pressure is maintained at a first pressure PH1, then at a second pressure PH2 and finally at a third pressure PH3. Like the percent display of the setter 173, actual values of these pressures are displayed by display unit as the back pressure of the screw. Holding times of the first and second pressures are set in setting display units 177 and 178 in terms of seconds.

FIG. 7 shows the detail of the setting display panel 12 for setting instructions regarding the operation on the side of the mold clamping device shown in FIG. 1. As shown, there are provided setting display units 201 and 202 for setting low and high mold clamping pressures in terms of percentage with reference to a predetermined maximum pressure.

203 shows a display unit displaying an actual position of a movable die plate carrying the movable metal mold. When a zero setting push button 204 is depressed, when male and female metal molds are aligned and when these molds are clamped with a predetermined pressure, a zero is set in the position display unit 203. A reset push button 205 is provided for erasing the displayed position of the movable die plate. 206 shows set display region of a stroke at which the movable die plate is clamped during the mold clamping step. LS2 of the setting display unit 207 represents a position at which the male and female molds are closed. Setting display units 208, 209 and 210 respectively display positions LS2A, LS2E and LS2D. Between the positions LS2, LS2A, LS2E and LS2D the movable die plate is moved at a low speed 211, a high speed 212 and a medium speed 213 respectively. A speed setting and display unit 214 sets a high speed between position LS2D and a retracted position LS3 (225) to be described later. Speed setters 212 and 213 set a high speed and a medium speed respectively in the case of a three piece type metal mold, but in the case of an ordinary two piece type metal mold, the medium speed set by the speed setter 213 is effective. A display unit 215 displays a set display region regarding a mold opening stroke. As shown, position setting display units 221, 222, 223, 224 and 225 are set with positions LS3A, LS3D, LS3E, LS3B and LS3 respectively at which speeds are transferred corresponding to the speeds set by speed setters 216, 217, 218, 219 and 220 respectively during the mold opening stroke. The male and female molds are moved from mold clamping position LS2 to position LS3A while they are closed, and at position LS3A the male mold usually carried by the movable die plate begins to separate away from the female mold. Position setting display units 226, 227 and 228 located at the lowermost stage of the display panel set operation starting instructions (LS100) for a core inserting position, a core withdrawal position and a molded product take out position.

On the left side of the display panel 12 are mounted a setter 229 for operating a pin pushing out the molded product from the metal mold, and a mold thickness information setter 230 necessary for automatically setting a retraction limit position of the movable die plate necessary for exchanging the metal mold for the purpose of molding another type of products. The setter 229 includes a setting and display unit A which sets a number of times of the operations of the push out pin operated when the movable die plate reaches the retraction limit position, a setting display unit B which sets and displays the number of operations of the push out pin while the movable plate is retracting, and a speed setting display unit VE which sets and displays the speed of the push out pin at the time of pushing out the molded product. The metal mold thickness information setting unit 230 includes a display unit MT which displays a thickness information of a new metal mold to be used next, and a display unit MTOLD displaying the thickness of the metal mold now being used.

FIGS. 8-1 and 8-2 show the detail of the data setting unit utilized for each setting display unit of the setting display panels 11, 12, etc., in which FIG. 8-1 shows a setting display unit which displays two orders of magnitude of decimal numbers. The setting display unit shown in FIG. 8-1 comprises an UP switch 251 which increments the digits of a display device 252 comprising seven segments of luminous material, and a DOWN switch 253 utilized to decrease the values. 254, 255 and 256 designate an UP switch, digit display device and a DOWN switch which are utilized for digits of the first order.

FIG. 8-2 shows a connection diagram for use in the setting display unit shown in FIG. 8-1. In FIG. 8-2, 254 and 256 designate UP switches for the first order digits, 255 designates a digit display unit comprising seven luminous elements, and C1 represents a common bus line, 8 lines thereof being connected to the central processing unit 15 (FIG. 2) via a first converter 258. In the same manner, there are provided UP and DOWN switches 251 and 253 for digits of the second order, digit display device 252 comprising seven luminous elements and a common bus line C2, eight lines thereof being connected to the central processing unit 15 via a second converter 259. The first and second converters 258 and 259 select display device 252 or 255 by designating bus lines C2 and C1 at independent timings from the central processing unit 15. A switch detector 257 is constructed to identify that which one of the UP and DOWN switches 251, 253, 254 and 256 has been operated by using a low level signal. The central processing unit 15 operates to increment or decrement by one the values of respective display devices corresponding to the operated switch. More particularly, counting registers R1 and R2 are provided for the memory area DA-M of the central processing unit 15 corresponding to display devices 252 and 255 respectively. For example, when UP switch 251 is depressed, the count of register R1 is incremented by 1, whereas when DOWN switch 253 is depressed the count of register R1 is decremented by 1. When switch 251 or 253 is continuously depressed over a predetermined interval, the count of the register R1 would be incremented or decremented as $+1, +2, +3, \ldots$ or $-1, -2, -3, \ldots$ Further, a carry or borrow is neglected.

Figure 9:
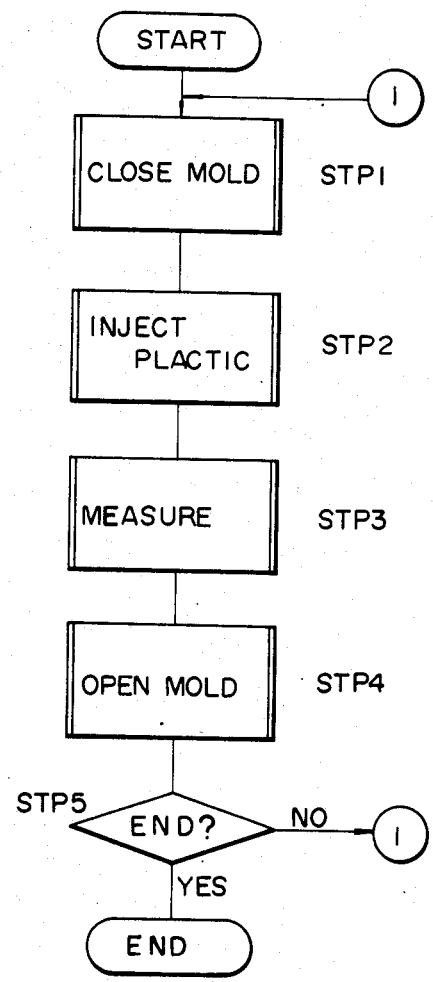
FIG. 9 is a flow chart showing successive steps of the molding operation.

FIGS. 9 through 13 illustrate flow charts of principal programs stored in the program memory device of the central processing unit. Thus, FIG. 9 shows a subroutine corresponding to respective steps shown in FIG. 1. At step 1, the metal mold is closed or clamped, at step 2 the plastic is filled and injected, at step 3 metering is performed, and at step 4 the mold is opened. At step 5 a judgement is made as to whether molding of a product has ended or not. When the result of judgement is NO, the program is returned to step 1.

Figure 10:
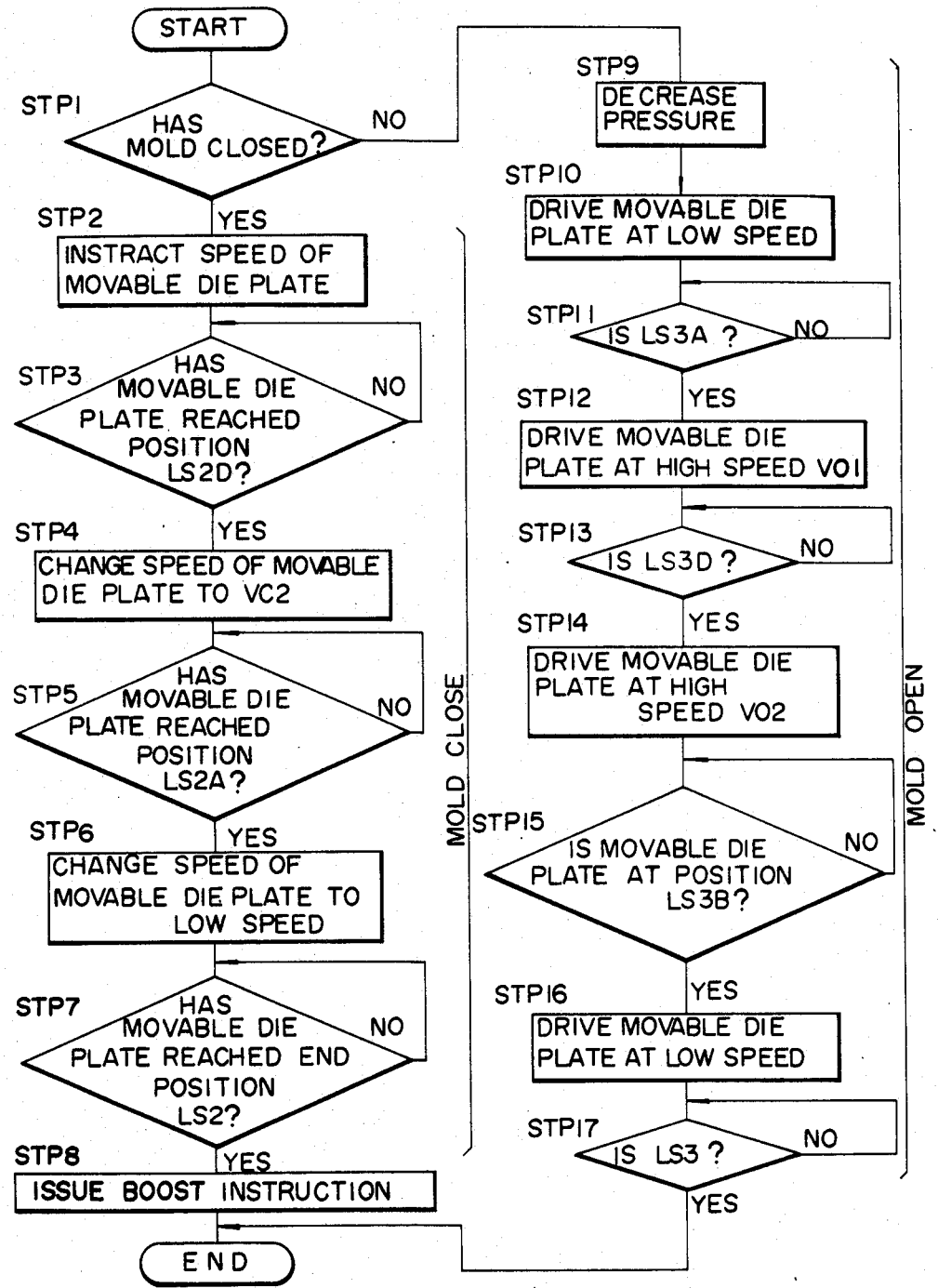
FIG. 10 is a flow chart showing the detail of the mold clamping steps shown in FIG. 9.

FIG. 10 shows subroutines regarding mold opening and closing. The flow chart shown in FIG. 10 will be described with reference to FIG. 7. At step 1, a judgement is made as to whether the mold has been closed or not. When the result of judgement is YES, at step 2, the speed VC1 of the movable die plate is instructed. Then at step 3, a judgement is made as to whether the movable die plate has reached position LS2D (sensed by a sensor not shown) or not. When the result of judgement at step 3 is YES, at step 4 the speed of the movable die plate is changed to VC2. Then at step 5, a judgement is made as to whether the movable die plate has reached position LS2A. When the result of judgement is YES, at step 6 the speed of the movable die plate is transferred to a low speed and at step 7, a judgement is made as to whether the movable die plate has reached a stop position LS2 or not. When the result of judgement of step 7 is YES, a boost instruction is issued at step 8 so as to urge the movable die plate against the stationary die plate with a sufficient force so as to prevent splash of the plastic as well as pressure drop when the plastic is injected into the mold. At step 1 when the mold is not yet closed, at step 9 a pressure decrease instruction is issued, and then at step 10 the movable die plate is moved to position LS3A at the low speed in accordance with a low speed instruction. At step 11 a judgement is made as to whether the position is LS3A or not, and when the result of judgement is YES, at step 12 the speed of the movable die plate is changed to a high speed VO1 to reach position LS3D. At step 13 a judgement is made as to whether the movable die plate has reached position LS3D. When the result of judgement is YES the speed of the movable die plate is changed to a high speed VO2, where setting display unit 223 is not operated. At step 15 a judgement is made as to whether the movable die plate has reached position LS3B or not. When the result of this judgement is YES, at step 16 the movable die plate is moved at a low speed so as to move the movable die plate to a retracted position LS3 at which the movable die plate is stopped. When the result of judgement at step 17 is YES, the processing of the program is terminated. It should be understood that, in the flow chart shown in FIG. 10, settings of positions LS3M, LS30 and LS100 are omitted.

Figure 11A:
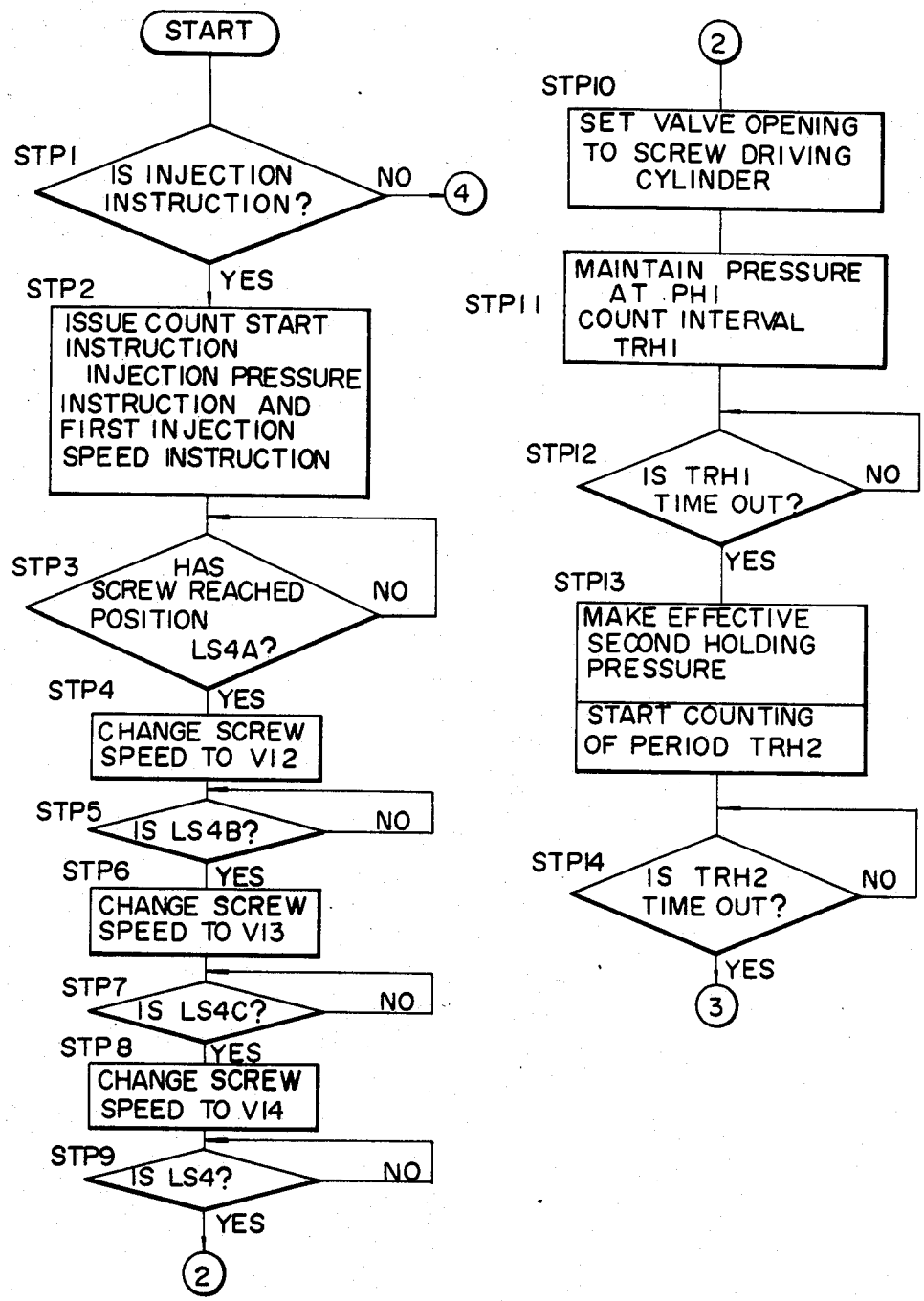
FIG. 11 is a flow chart showing the detail of the plastic filling and the metering steps shown in FIG. 9.
Figure 11B:
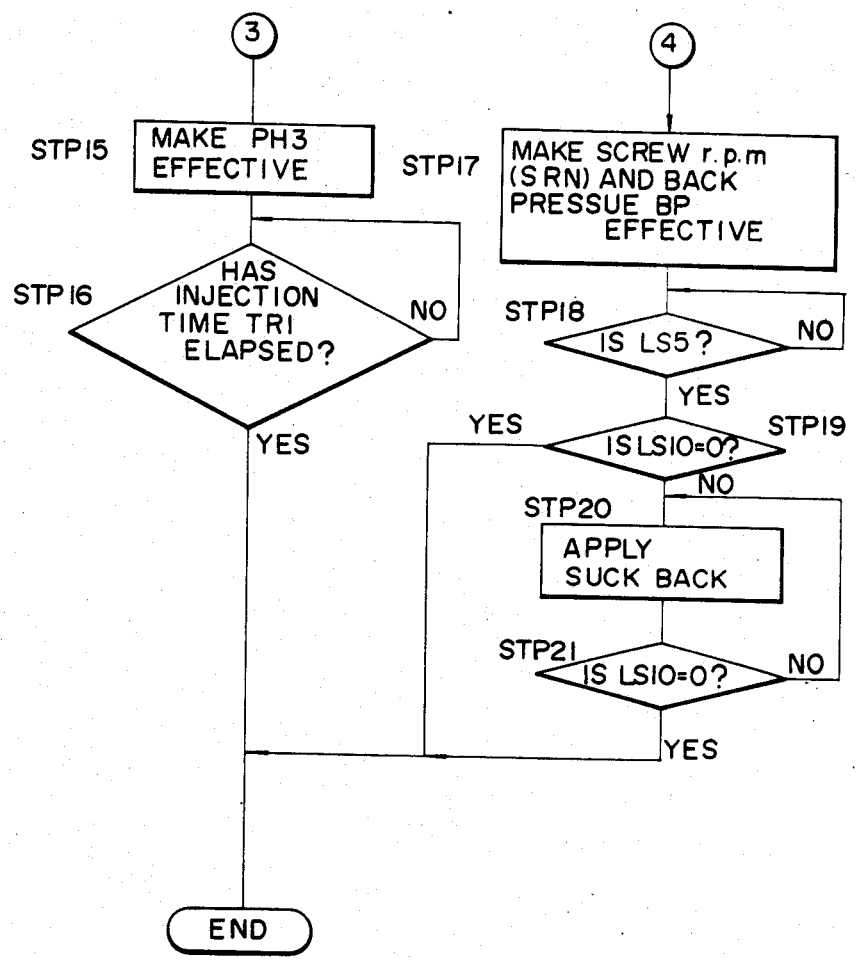

FIG. 11 is a flow chart showing the steps executed on the injector side, that is an injection and filling step, a pressure holding step and a metering step. Thus, at step 1 a judgement is made as to whether an instruction is an injection filling instruction or not. When the result of step 1 is YES, steps 2 through 9 regarding injection, filling and pressure holding are executed, whereas when the result is NO, metering steps 17 through 21 are executed. When the result of step 1 is YES, at step 2 a count start instruction of the injection time TR1, an injection pressure (Pi) instruction and a first injection speed Vi1 (the speed of the screw) instruction are issued. Consequently, the screw is moved from position LS5 shown in FIG. 6 (setting display unit 157), and at step STP3 a judgement is made as to whether the screw has reached position LS4A. When the result of step 3 is YES, at step 4 the screw speed is changed to second speed $V_{12}$. When the result of step 3 is NO, the judgement is repeated. At step 5 a judgement is made as to whether the screw has reached position LS4C. When the result of judgement is YES, at step 6 the screw speed is changed to third speed $V_{13}$. At step 7 a judgement is made as to whether the position is LS4C or not. When the result of step 7 is YES, at step 8 the screw speed is changed to $V_{14}$. At the last step 9, a judgement is made as to whether the position is LS4 or not. When the result of judgement at step 9 is YES, the program is transferred to pressure holding steps 10 through 16.

More particularly, at step 10, although the screw is actually stopped, a valve flow quantity to a screw driving cylinder is given so as to set the degree of opening of the valve such that propagation of pressure would be smooth. At step 2 first holding pressure PH1 is made effective and starting of counting of the interval TRH1 in which the pressure PH1 is maintained is instructed. (See setting display units 174, 177 shown in FIG. 6). When the interval in which the pressure is held elapses the set period TRH1, at step 12 a judgement is made as to whether TRH1 is time out or not. When the result of judgement at step 12 is YES, at step 13 a second holding pressure PH2 is made effective and counting of the holding time is started. In the same manner, as the set time TRH2 has elapsed, at step 14 a judgement is made as to whether TRH2 is time out or not.

Then at step 15 a third holding pressure PH3 is made effective. Then at step 16 a judgement is made as to whether already set injection time TR1 has elapsed or not. When result of judgement at step 16 is YES, the pressure holding step terminates.

When the result of judgement at step 1 is NO meaning a metering step, at step 17 the number of revolutions SRR of the screw set by the setting display unit 166 is made effective, while at the same time, the back pressure value BP set by the setting display unit 171 is made effective. During the metering step, the screw is retracted to move away from the mold while rotating. When the screw reaches the retract limit position LS5 given by setting display unit 157 shown in FIG. 6, at step 18 a judgement is made as to whether the screw has reached the position LS5 or not. When the result of this judgement is YES, at step 19 a judgement is made as to whether a suck back quantity LS10 has been applied or not. When LS10=0, it means that the metering step has terminated. When the result of judgement at step 19 is NO, that is a suck back quantity is set, at step 20, a certain amount of suck back is applied. At step 21, a judgement is made as to whether LS10=0 or not. When the result of judgement is YES, it means that the metering step has been completed.

FIG. 12 shows a flow chart of an instruction routine (LOAD/STORE ROUTINE) regarding the data transfer in which the molding data is transferred or loaded in the data memory area DA-M of the central processing unit 15 from the subprocessing unit 26 or vice versa. The flow chart shown in FIG. 12 will now be described with reference to FIG. 4. Data loading is enabled when switch 101 shown in FIG. 4 is transferred to the DATA side. More particularly, as a result of this transfer switching an interruption instruction is issued. At step 1 a judgement is made as to whether UP and DOWN switches 106 and 107 corresponding to a predetermined data necessary for the setting display unit 102 to set a molding data number corresponding to a given product are ON or not. At step 2 a judgement is made as to whether an operated switch is an UP switch or a DOWN switch. When the result of judgement at step 2 is YES, that is when the UP switch 106 is ON, at step 3 a displayed value is incremented by 1. On the other hand, when the result of judgement at step 2 is NO, that is when the DOWN switch 107 is ON, at step 4, the displayed value is decremented by 1. Then at step 5, a judgement is made as to whether loading key 104 is ON or not, and when the result of judgement is YES, at step 106, the molding data set by the subprocessing unit 26 are read out from the magnetic tape (MT) device 32 and written into common RAM25, and a LOAD FLAG bit is established. Then at step 7, by the operation of the central processing unit 15, the molding data in the common RAM25 are loaded in the data memory area DA-M of the CPU15, and displayed on setting display panels 11 and 12, and the LOAD FLAG bit is released. When the result of step 5 is NO, at step 8 a judgement is made as to whether a STORE key 103 has been depressed or not. When the STORE key 103 is not depressed, the program is returned to step 1. When the result of judgement of step 8 is YES, at step 9 molding data stored in the data memory area DA-M of the central processing unit 15 and a data number corresponding to the molding data (set by 12) are written into the common RAM25, and a STORE FLAG bit is established. Then at step 10, the molding data and the data number are transferred from the common RAM25 to the data memory device of the subCPU26 and the STORE FLAG bit is released.

Figure 13:
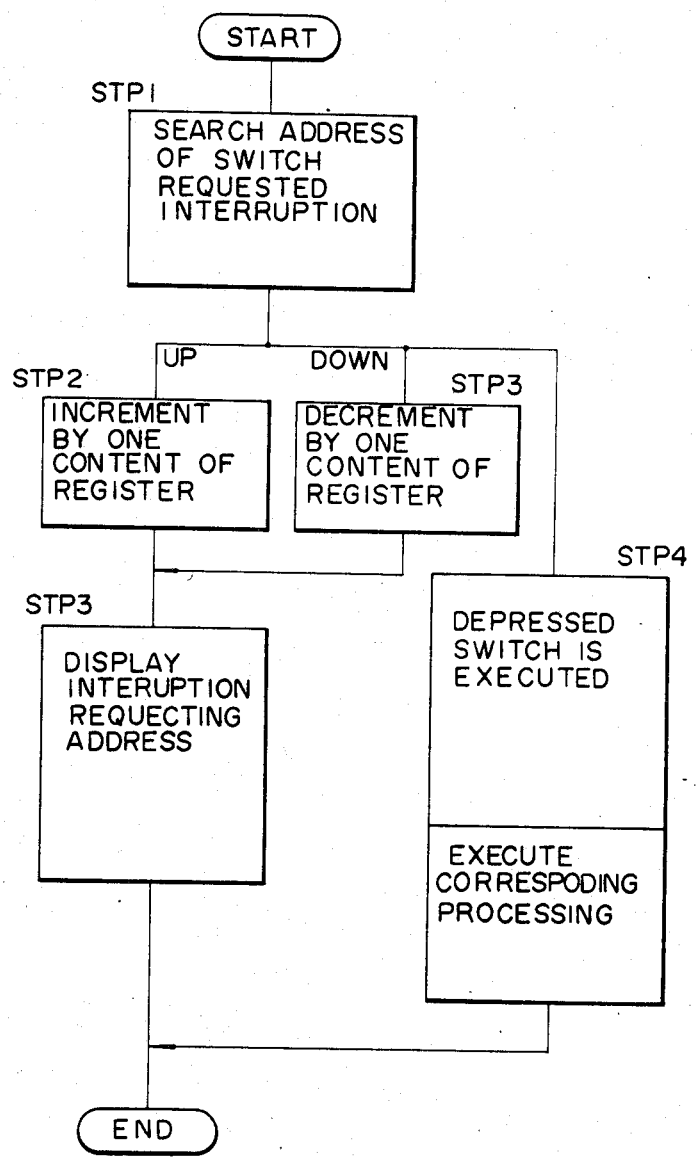
FIG. 13 is a flow chart showing a routine regarding processings corresponding to push button operations and key inputtings of the molding data setting display panel.

FIG. 13 is a flow chart showing processing routines of respective setting display units on the setting display panel.

When UP or DOWN switch and a selection switch provided for each setting display unit are depressed, an interruption is executed. At step 1, an address corresponding to a switch requesting an interruption is searched. Where the searched switch is an UP switch, at step 2 the content of a register corresponding to the UP switch and stored in the data memory device in the central CPU15 is incremented by 1. On the other hand when the result of search executed in step 1 shows a DOWN switch, at step 3 the content of a register corresponding to the DOWN switch is decremented by 1. Where a switch requesting interruption is another switch or key, at step 4 a processing corresponding to the depressed switch or key is executed. Regarding the setting display panel on the injector side, the switch or key corresponds to KEY, ENABLE, DISP of setter 168 or BOOST, and ALARM related to the injection quantity of setter 179 or a FPC push button for the final packing control (FPC). When push buttons 179A and 179B corresponding to FPC and ALARM are depressed to establish FPC and ALARM states, lamps (shown by small circles) of the display units are lighted. Although not shown in the flow chart shown in FIG. 13, the displays in display areas, for example 172, 167 and 169, of the setting display panel are made by converting signals from respective sensers into digital values with an A/D converter and then storing the digital values in corresponding registers of the data memory device in the central processing unit 15 and then lighting luminous elements at proper timings by the stored values. The timings of displays have cycles of several milliseconds to several tens milliseconds for displaying different objects on different display devices. Then the operator can observe displayed matters.

The correspondence between the molding data and the metal molds mounted on the injection machine will now be described. It is essential to confirm the fact that the molding data stored in the central processing unit 15 exactly corresponds to a specific mold mounted on the molding machine before starting the same. Although there are many methods of confirmation, according to one method a code setter is provided for the mold so as to check correspondence between molding data and the mold before mounting the same on the injection molding machine. According to another method, while the mold is being mounted on the injection molding machine the molding data are selected on the basis of the mold code and then loaded. According to still another method, the mold code is incorporated in the molding data as a portion thereof, the mold data are stored in a data memory device and a check program is stored in the program memory device of the central processing unit 15. Although in FIG. 2, the timer setting, data loading and setting display unit 29 is connected to the common RAM25 through bus line BUSL2 except 101–107 and 119 shown in FIG. 4, other elements may be connected directly to the bus line BUSL1 through interface I/F36.

As above described, according to this invention, a data setting display panel is provided regarding the molding data of an injection molding machine, push buttons that can instantaneously correct the displayed data are provided in respective display regions of the setting display panel and a data memory device is provided for storing actually displayed data so that the data can be corrected much more easily than a prior art system. Moreover, since the content (that is molding data) of the data memory device is constantly displayed on the setting display unit, it is possible to load molding data into the data memory device from outside thereof and to display the loaded data. Moreover, as it is possible to transfer and store the content of the memory device in an external memory device, at the time of molding new products the operator can readily prepare the molding data without using troublesome cut and try method. Moreover, when molding data are prepared, they can be stored in an external memory device. Also, it is possible to manufacture molded products by transferring the molding data that have been stored in the external memory device to the data memory device.

What is claimed is:

1. A control system for an injection molding machine of the type including a data setting unit for setting molding data corresponding to an injection operation and a mold clamping operation of said injection molding machine, and a control device which in response to data set in said data setting unit forms an instruction signal which controls said injection and mold clamping operations, comprising:
   a central processing unit including a main memory region storing said molding data;
   display means connected to said central processing unit for displaying the content of said main memory region;
   setting means for setting numerical data in said main memory region; and
   a data display unit including a plurality of luminous display elements adapted to display said numerical data to a predetermined order of magnitude; a plurality of up/down switches, each corresponding to a respective order of magnitude and disposed close to a corresponding luminous display elements; and data setting display means with terminals for connecting signal lines necessary for driving said data display unit to signal lines which detect ON/OFF states of respective switches.

2. The control system according to claim 1 wherein said setting means comprises a common memory means connected to said central processing unit and wherein said control system further comprises means for mutually transferring said molding data between said common memory means and said central processing unit.

3. The control system according to claim 2 wherein said setting means comprises a subprocessing unit connected to said common memory means, said subprocessing unit comprising a data memory means for storing said molding data and wherein said molding data are mutually transferred between said data memory means and said main memory means through said common memory means in response to an instruction from said transfer means.

4. The control system according to claim 3 whereing said data memory means in said subprocessing unit is connected to an external memory medium to mutually transfer said molding data between said data memory means and said external memory medium.

5. The control system according to claim 3 wherein another subprocessing unit for temperature control is connected to said common memory means and wherein temperature control data are mutually transferred between said data memory means of said first mentioned subprocessing unit and of said another subprocessing unit via said common memory means.

6. The control system according to claim 2 further comprising printing means connected to said common memory means.

7. The control device according to claim 1 wherein said display means includes luminous elements acting as numerical value display elements.

8. The control system according to claim 1 wherein said setting means comprises a setter for setting a production schedule designating manufacturing of a plurality of molded products.

9. The control system according to claim 1 wherein said central processing unit comprises means for storing test molding data.

* * * * *